(12) United States Patent
Tiner et al.

(10) Patent No.: US 11,502,394 B2
(45) Date of Patent: Nov. 15, 2022

(54) MANPACK BASE STATION

(71) Applicant: Parallel Wireless, Inc., Nashua, NH (US)

(72) Inventors: Jason Tiner, North Smithfield, RI (US); Rajesh Khanna, Auburndale, MA (US); Patrick McPhee, Ashby, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 16/718,001

(22) Filed: Dec. 17, 2019

(65) Prior Publication Data

US 2020/0194875 A1 Jun. 18, 2020

Related U.S. Application Data

(60) Provisional application No. 62/780,479, filed on Dec. 17, 2018.

(51) Int. Cl.
*H01Q 1/12* (2006.01)
*H01Q 1/27* (2006.01)
(Continued)

(52) U.S. Cl.
CPC .............. *H01Q 1/273* (2013.01); *A45F 3/04* (2013.01); *H01M 50/20* (2021.01);
(Continued)

(58) Field of Classification Search
CPC ..... H01Q 1/273; H01Q 1/1235; H01M 50/20; H04B 1/385; H04B 7/0413
See application file for complete search history.

(56) References Cited

U.S. PATENT DOCUMENTS 9,706,431 B1 * 7/2017 Tammisetti ........... H04L 49/109
9,711,859 B1 * 7/2017 Muesse .................. H01Q 1/362
(Continued)

FOREIGN PATENT DOCUMENTS

WO    WO-2018073701 A1 *  4/2018  ............... H01Q 1/42

OTHER PUBLICATIONS

LXN 500 LTE Ultra Portable Infrastructure—Motorola Solutions, Oct. 30, 2018.
(Continued)

*Primary Examiner* — Joseph J Lauture
(74) *Attorney, Agent, or Firm* — Michael Y. Saji; David W. Rouille

(57) ABSTRACT

A communications backpack is disclosed. In one embodiment, the communications backpack includes a backpack; a Radio Area Network (RAN) device in mechanical communication with the backpack; a mini-server in mechanical communication with the backpack and in electrical communication with the RAN device; at least one hot swappable battery in mechanical communication with the backpack and in electrical communication with the RAN device and the mini-server; at least two antennas, wherein the two antennas are stored in a first position alongside the backpack and are movable to a second position where the two antennas are coupled to the backpack and in electrical communication with the RAN device; and wherein the communications backpack provides a coverage area of up to 3 kilometers (km).

11 Claims, 6 Drawing Sheets

(51) Int. Cl.
  *A45F 3/04*     (2006.01)
  *H01M 50/20*    (2021.01)
  *H04B 1/3827*   (2015.01)
  *H04B 7/0413*   (2017.01)

(52) U.S. Cl.
  CPC ........... *H01Q 1/1235* (2013.01); *H04B 1/385* (2013.01); *H04B 7/0413* (2013.01)

(56) References Cited

U.S. PATENT DOCUMENTS

| | | | |
|---|---|---|---|
| 10,477,415 B1* | 11/2019 | Mar | H04W 52/36 |
| 2009/0268650 A1* | 10/2009 | Grondzik | H04B 1/03 370/310 |
| 2014/0323137 A1* | 10/2014 | Graffagnino | H04W 84/005 455/445 |
| 2017/0310925 A1* | 10/2017 | Chiang | H04N 7/183 |

OTHER PUBLICATIONS

LXN 500 LTE Ultra Portable Infrastructure, Motorola Solutions, Data Sheet, Apr. 2018.
LXN 500 LTE Ultra Portable Infrastructure Backpack Overview video—https://www.bing.com/videos/search?q=motorola+public+safety+backpack&&view=detail&mid=EE8453157F5, Oct. 30, 2018.

* cited by examiner

MANPACK BASE STATION

CROSS-REFERENCE TO RELATED APPLICATIONS

This application claims priority under 35 U.S.C. § 119(e) to U.S. Provisional Pat. App. No. 62/780,479, filed Dec. 17, 2018, titled "Manpack Base Station" which is hereby incorporated by reference in its entirety for all purposes. This application also hereby incorporates by reference U.S. Provisional Patent Application No. 62/831,141, filed Apr. 8, 2019, titled "Mobile Base Station Bubble Network". This application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes, having attorney docket numbers PWS-71700US01, US02, US03, 71710US01, 71721US01, 71729US01, 71730US01, 71731US01, 71756US01, 71775US01, 71865US01, and 71866US01, respectively. This document also hereby incorporates by reference U.S. Pat. Nos. 9107092, 8867418, and 9232547 in their entirety. This document also hereby incorporates by reference U.S. patent application Ser. No. 14/822,839, U.S. patent application Ser. No. 15/828427, U.S. Pat. App. Pub. Nos. US20170273134A1, US20170127409A1 in their entirety.

BACKGROUND

There may exist certain scenarios where wireless network coverage is non-existent or minimized. For example, mission critical environments such as emergency conditions, police, fire and military may require a wireless network where previously none had been available or where preexisting network infrastructure is no longer available. Another example scenario is business critical environments such as mining operations and the like where private networks would be useful to provide enhanced operational efficiency.

SUMMARY

A Manpack base station is described. In one embodiment, a communications backpack includes a backpack; a Radio Area Network (RAN) device in mechanical communication with the backpack; a mini-server in mechanical communication with the backpack and in electrical communication with the RAN device; at least one hot swappable battery in mechanical communication with the backpack and in electrical communication with the RAN device and the mini-server; at least two antennas, wherein the two antennas are stored in a first position alongside the backpack and are movable to a second position where the two antennas are coupled to the backpack and in electrical communication with the RAN device; and wherein the communications backpack provides a coverage area of up to 3 kilometers (km).

DETAILED DESCRIPTION

Figure 1:
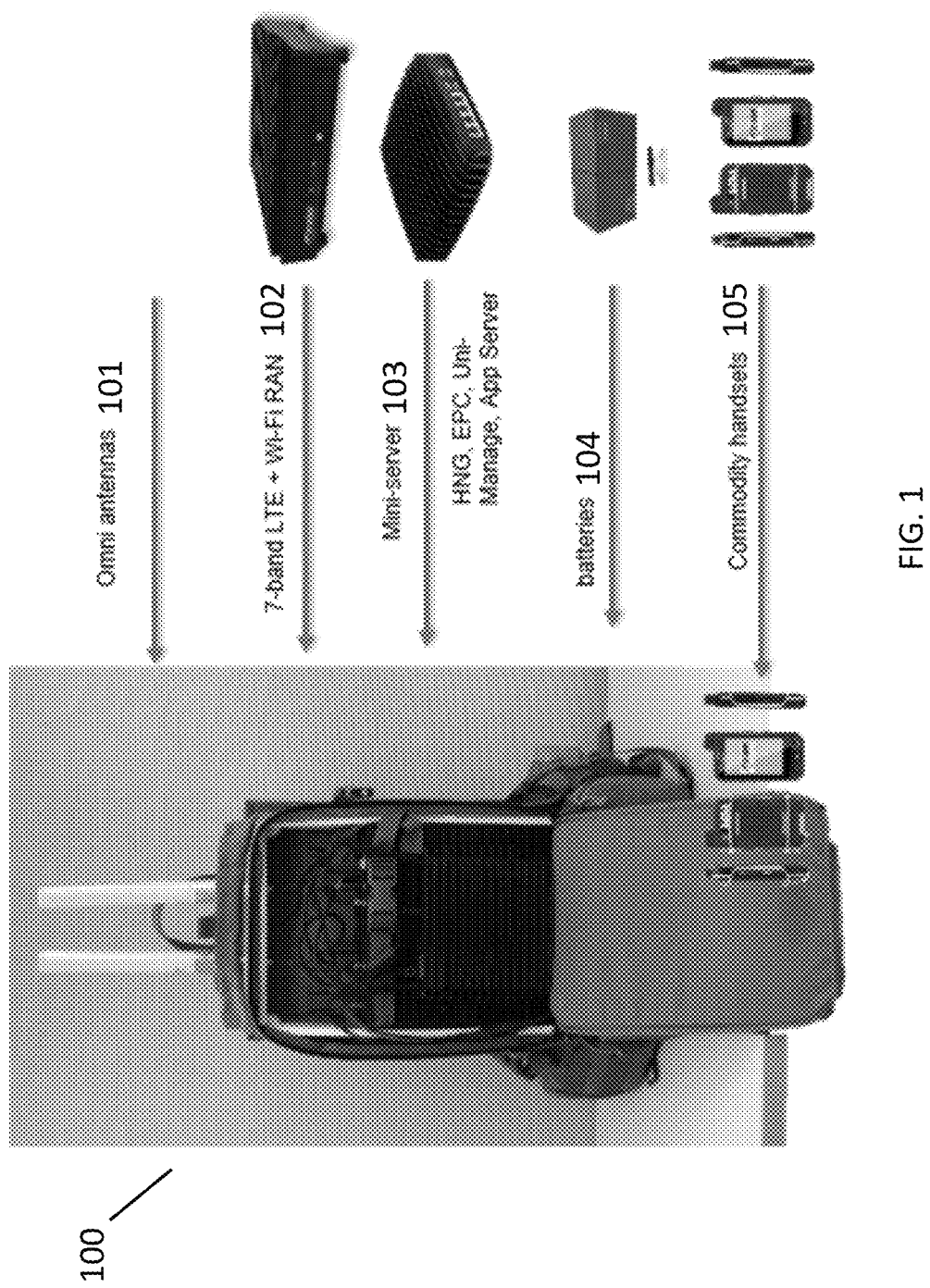
FIG. 1 is a system diagram showing different components of a Manpack base station, in accordance with some embodiments.

The invention relates generally to a wireless networking system, and in particular, to a portable communications backpack, sometimes referred to herein as a manpack base station. The communications backpack is a Human Carriable/Man Portable In-Vehicle/BYOC device. The backpack includes two components, a radio access network (RAN) (base station) and a small form factor general purpose server, which may be combined into one component. The RAN features different RF outputs for access depending on coverage area, situational awareness without adding additional complexity, Fastest Bubble Coverage with Plug-n-Play, Self-Healing and Self-Organizing Network Orchestration, and Meshing. ICIC may be provided. Also provided may be Intra/Inter handoff and roaming for all Coverage Areas. The communications backpack may be daisy chained to other communications backpacks via mesh functionality in the in-backpack RAN. The communications backpack includes an application server to allow first responders to use applications that bridge the LMR & LTE environments. The communications backpack enables instant connectivity for non-technical personnel via a simple on-off switch and auto-configuration. Coverage expands in real time as human, vehicle, &/or in-vehicle base stations arrive.

The communications backpack provides a fully operational network in a compact form factor. In some embodiments, the pack is built to hold 15 hours radio uptime and up to 30 pounds. No tools required; bottom weighted, stands up. Full HNG, EPC able to be part of the backpack. Over-the-top VoLTE is available, as well as 5G when available. 5W transmit power when not carried but variable TX power available, including while being carried. The RAN can provide an access network via, for example, LTE and Wi-Fi, but any radio access technology or "G" or combination of technologies could be used, e.g., 2G/3G/4G/5G+Wi-Fi. A body camera, walkie-talkie, or smartphone may be directly plugged into the base station using a physical port or via Wi-Fi, 3G or 4G LTE. In some embodiments a Wi-Fi passthrough is also provided. Where Wi-Fi access is provided the UEs or devices on the Wi-Fi network can be bridged onto the network operator's network via a security gateway located in the mini server/backpack HNG. The communications backpack is vibration resistant, uses push-on connectors and offers software updates via Wi-Fi as well as ethernet.

The backpack HNG may provide VoIP via, e.g., an Asterisk server, which has the advantage that it is more lightweight than an IMS core; an element management server such as Parallel Wireless Uni-Manage; and a full, self-contained EPC and may further include a USB dongle for backhaul/IP egress of the HNG and/or of the whole system via LTE or Wi-Fi, as needed. The backpack HNG may be provided within a small form factor server that is part of the backpack and fastened to the radio access network (base station) (fasteners may include clips, plastic ties, plastic fittings, or other equivalent fasteners). The communications backpack may use a single multifunction antenna (e.g., a panel antenna or single pole antenna for use with multiple bands) or use multiple antennas. The in-backpack RAN and the in-backpack HNG are further defined in the documents incorporated by reference and may have all or any combination of the features defined therein with reference to the CWS and HNG products discussed therein.

The Manpack base station can be used to provide mission critical solutions—emergency, coverage extension, rural coverage or events. The Manpack base station can also provide business critical solutions such as oil and gas, mining, enterprise—private network for enhanced operational efficiency.

Figure 2:
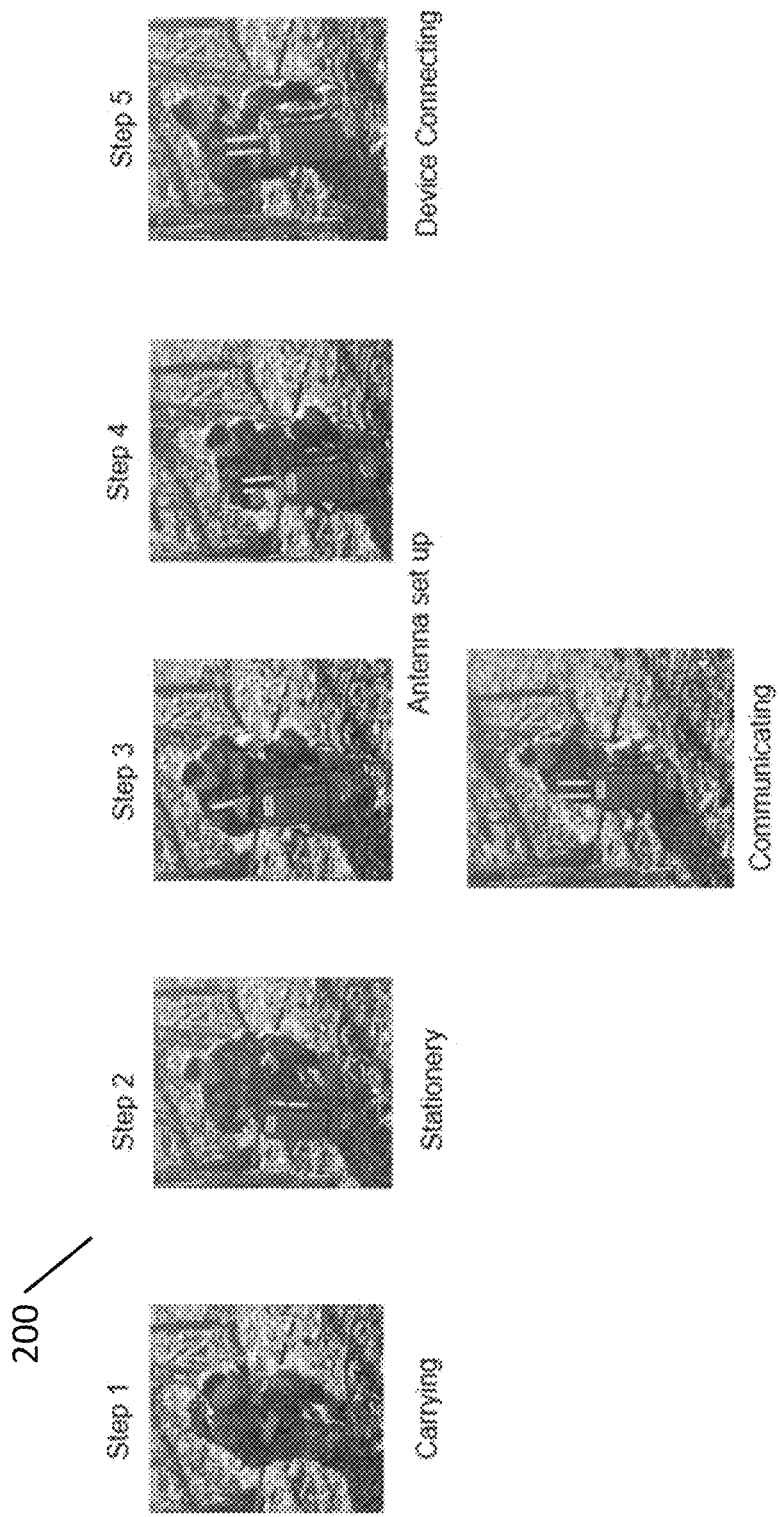
FIG. 2 is a diagram showing a series of steps for setting up and using the Manpack base station, in accordance with some embodiments.

In one embodiment of a Manpack base station, use cases include
   Human Carriable/Man Portable and
   In-Vehicle/BYOC (Bring Your Own Coverage)
   Key Features
   Different RF outputs available depending on coverage area
   Situational Awareness without adding additional complexity
   Fastest Bubble Coverage with Plug-n-Play
   Self-Healing and Self-Organizing Network Orchestration
   Mesh with ICIC provides seamless Intra/Inter handoff and roaming for all Coverage Areas
   Daisy Chain 1—Many=>Dynamically create, expand, and/or contract NIB Coverage
   Application Server allows First Responders to use apps that bridge the LMR & LTE worlds
   Instant connectivity for non-technical personnel
   Coverage expands in real time as Human, Vehicle, &/or In-Vehicle arrive
   Provides coverage and capacity exactly where needed. Stationary coverage for small system setups in key locations to guarantee coverage and capacity for dedicated users. Temporary coverage for portable solutions for extending coverage in remote or underground locations with limited macro network reach and in peak load situations such as mass events. Disaster recovery for establishing communications capabilities in disaster areas where macro network is compromised.
   Fully operational network in a compact form factor:
   27 LBs
   RAN, core, HNG, antennas, EMS, applications server, batteries
   Instant coverage 0.5 km to 3 km
   7 LTE Band (field selectable)+Wi-Fi
   Flexible backhaul: LTE, Ethernet, satellite, mesh
   Up to 15 hour power solution, re-chargeable
   Plug-n-play: Easy bring up by non-technical personnel
   Easy network management via an app FIG. 1 shows a Manpack 100 and its various components including: omni antennas 101, a 7-band LTE and Wi-Fi RAN 102, a mini-server 103, batteries 104 and commodity handsets 105. In some embodiments the batteries are milspec and rechargeable. The batteries are stored in the bottom compartment of the backpack, resulting in a bottom weighted design that stands up, as well as enabling easy access. Ports between the bottom compartment and central compartment enable the batteries to be electrically coupled to the base station, which runs on a ruggedized server in the main compartment. The antennas are located on the exterior of the backpack or in a radio transparent and/or visually transparent compartment at the top of the backpack. Ports between the central compartment and the antennas enable these antennas to be electrically coupled to the base station without compromising weatherproofing and portability. Connectors may be provided, which may be color-coded, in some embodiments. In some embodiments, the antennas may be unhooked, unscrewed, or detached for storage and stowed in a side compartment or hooks of the backpack, for example, in the case of 2× omnidirectional pole antennas that may impede movement or stowability of the backpack.
   Military Communications Backpack Features:
   Modular Pack System
   Rigid Dynamic Frame that absorbs shock and flexes with your body. A bolstered Ventilation and Stability System allows stable and secure fit over body armor. PALS webbing and harness are provided and accommodate MOLLE accessories. Clear port over keyboard and display. Built for weather (including water and dust protection). COR-DURA® with Teflon®, PU coatings, UV, and YKK® zippers may be provided.
   Non-Technical Personnel Features
   Color coded cables and connectors
   QuickStart guide FIG. 2 shows a set of steps 200 for installation of the Manpack in tactical operation. These include: carrying, stationary, antenna set up, device connecting and communication. On-site setup time can be less than 5 minutes. Color coding of cables and connectors is user friendly for non-technical personnel.

The Manpack includes a mini-server. Software components on a mini-server include

EPC

Uni-Manage to operate via Web browser on LTE Device or Laptop

PW-HNG (HetNet Gateway)—provides self-configuring, self-optimizing, and self-healing.

PW-Uni-Manage Element Management System (EMS: a web-based application for management, monitoring, and health status for all Parallel Wireless network elements PW-EPC (Evolved Packet Core)—a full LTE core solution consisting of MME, Serving GW, PDN GW, and HSS components, or any combination of these, deployed as virtualized functions on any COTS hardware, providing a single box fully functional solution.

In some embodiments, an app server or Content Server could be provided in the manpack. The Content Server in some embodiments would be containing CentOS for Asterisk (PBX) Server, LMR/LTE Interop, other voice, data and sharing Apps; Allows OTT voice application w/out licensing costs; having N+1 redundancy. A COTS Server, HNG/EPC/IMS/EMS/Apps Server could be used with optional Ruggedized/Vibration protection. An exemplary server would have the following characteristics and could be used with this manpack:

| | |
|---|---|
| Dimensions | 4.25 × 3.27 × 0.94 inches |
| Weight | 10.6 ounces |

Dust Protected/Splashing Water

| | |
|---|---|
| Operating Temperature | −40° C. to +70° C. |
| Input Power | 12 VDC |
| Power Consumption | 4.5 W-10.5 W |

In some embodiments, network in a box (NIB) evolved packet core (EPC) or other 2G/3G/4G/5G functionality includes: Single Platform for All Control and Bearer Plane Functions; Virtualized, standards-based; Co-located with HNG on the same COTS server; MME, SGW, PGW; responsible for IP address allocation for the UE, QoS Enforcement, deep packet inspection (DPI) and flow-based charging according to rules from the PCRF (Policy Control and Charging Rules Function); QoS authorization for data flow to be treated in PCEF and ensures that this is in accordance with the user's subscription profile; and a HSS, in some embodiments.

The App server provides voice and data communications

Content Server containing CentOS for Asterisk (PBX) Server, LMR/LTE Interop, other voice, data and sharing Apps 3GPP compliant Advanced comms solution w/integrated voice, video and LMR/to LTE capabilities, PPT Public Safety ready, resilient Push-to-Talk and Push-to-Video solution with organizational hierarchy support and authentication Flexibility to customize Optional: recording, conferencing, enterprise VoIP Uni-Manage element management system EMS (element management System) to manage the network:

Device Management

Fault Management

System administration

Web and app GUI designed for non-technical personnel

Resides on the same mini-server as HNG, EPC, App server

Runs on a mobile device (app) or laptop

RAN: CWS-210 features and specifications as man carriable

CWS-210 (2 carriers×0.5 W)–7 LTE bands+Wi-Fi

Ruggedized Enclosure

Instant 500 m+Public Safety LTE Bubble Coverage

Instant LTE connectivity

Dynamic LTE Frequency Scanning and Selection using: Uni Manage w/browser via secure Wi-Fi or direct connection Dynamic Geolocation using Uni-Manage Low power consumptions allows extended deployment with hot swappable batteries (4 batteries provides up to 12 hours of use, rechargeable)

Self-Healing and Self-Organizing through HNG Network Orchestration

Mesh w/ICIC provides seamless Intra/Inter handoff and roaming of TOPS Coverage Areas Daisy Chain 1—Many=>Dynamically create, expand Coverage Key Specs

| | |
|---|---|
| Dimensions | 9.5 × 9.5 × 2.75 inches |
| Weight | 7.3 lbs. |
| IP67/Nema3 | Dust/Splashing Water |

Vibration/Shock protection

| | |
|---|---|
| Operating Temperature | −30° C. to +50° C. |
| Input Power | 12-24 VDC |
| Power Consumption | 60 w |

The Manpack provides for storage and installation of antennas.

Multi-purpose

Omni (to project up)

High gain

Access: Wi-Fi, LTE

Backhaul: mesh, LTE

GPS

Two antenna configurations are contemplated. Dual omnidirectional antennas are provided for MIMO. Or, one omnidirectional antenna, e.g., a panel antenna, is faced upward. The backpack has a radio transparent panel above the antenna in this case and the antenna can be protected from the elements. A GPS antenna can be located under the transparent panel and points to the sky for signal reception.

The Manpack includes one or more batteries and cables.

BA 5590 Battery

Voltage—15 Volts (12v Mode)

Capacity—15000 mAh (12 Volt Mode) each

Weight—35.3oz each

Chemistry—Lithium Sulphur Dioxide

Dimensions—5.00"×2.45"×4.41"

Qty 4 provides up to 12 hours of uptime

Rechargeable 12v 4-Way Splitter Sub Assembly

Allows Hot Swapping Batteries

Includes diodes to keep batteries and cells isolated

Provides 12v output on pins 4,5 (positive) & 1,2 (ground)

20" Length/Not terminated/Ruggedized over Y splitter

Different devices may be used with the Manpack base station. These include wearables, smart textiles, biometric & environmental sensors, cameras, displays, augmented vision, ruggedized handhelds, tablets, notebooks, modems, and vehicle solutions. All of these devices could connect to the radio access network.

Figure 3:
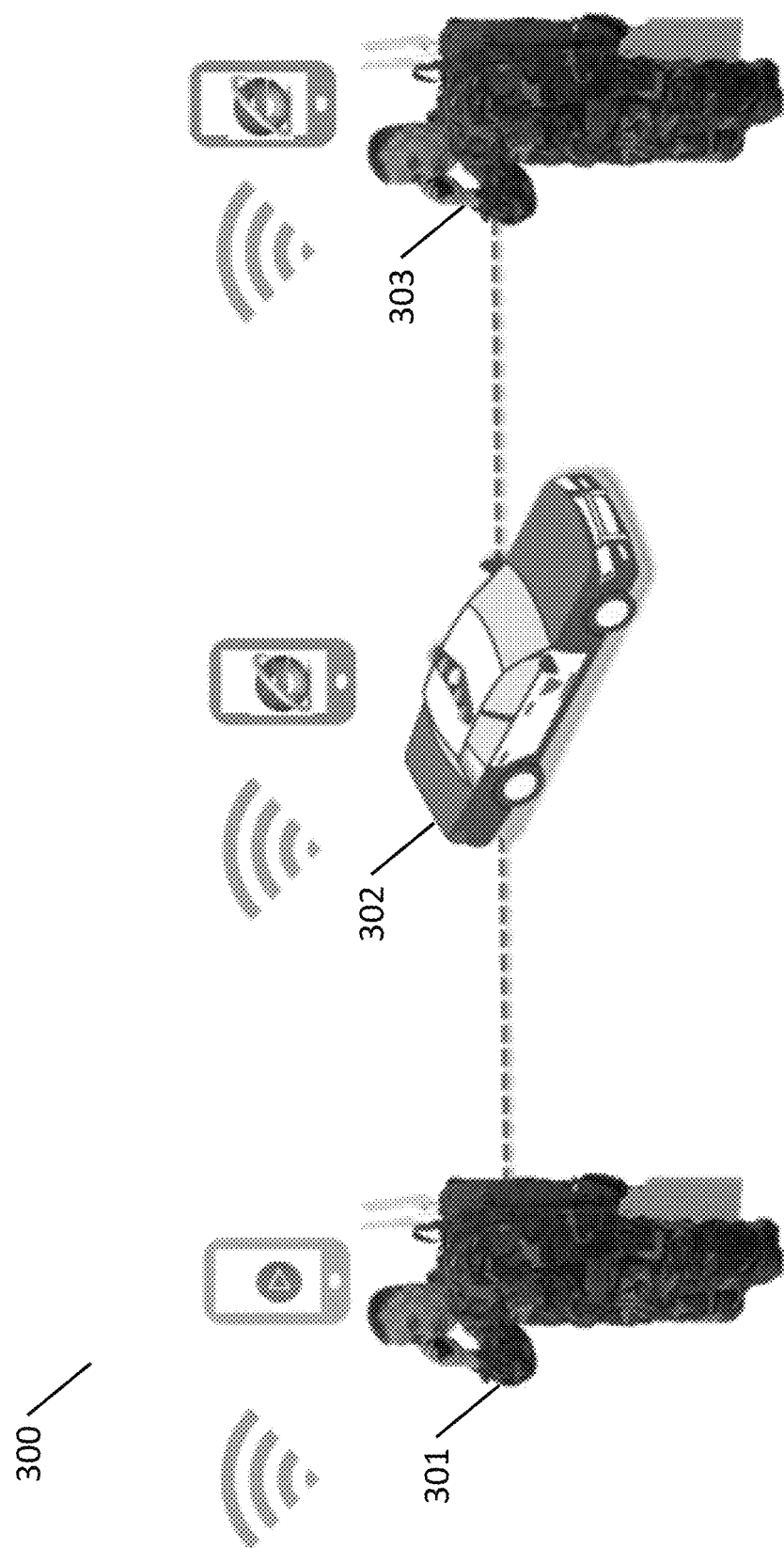
FIG. 3 is a diagram showing a pair of Manpack base stations in communication with an emergency services vehicle, in accordance with some embodiments.

FIG. 3 is a diagram showing meshing and daisy chaining between NIB and in-vehicle to extend network instantly into hard to reach places (i.e. disasters). A first user 301 is able to communicate with an emergency vehicle 302. A second user 303 can also communicate with emergency vehicle 302.

Figure 4:
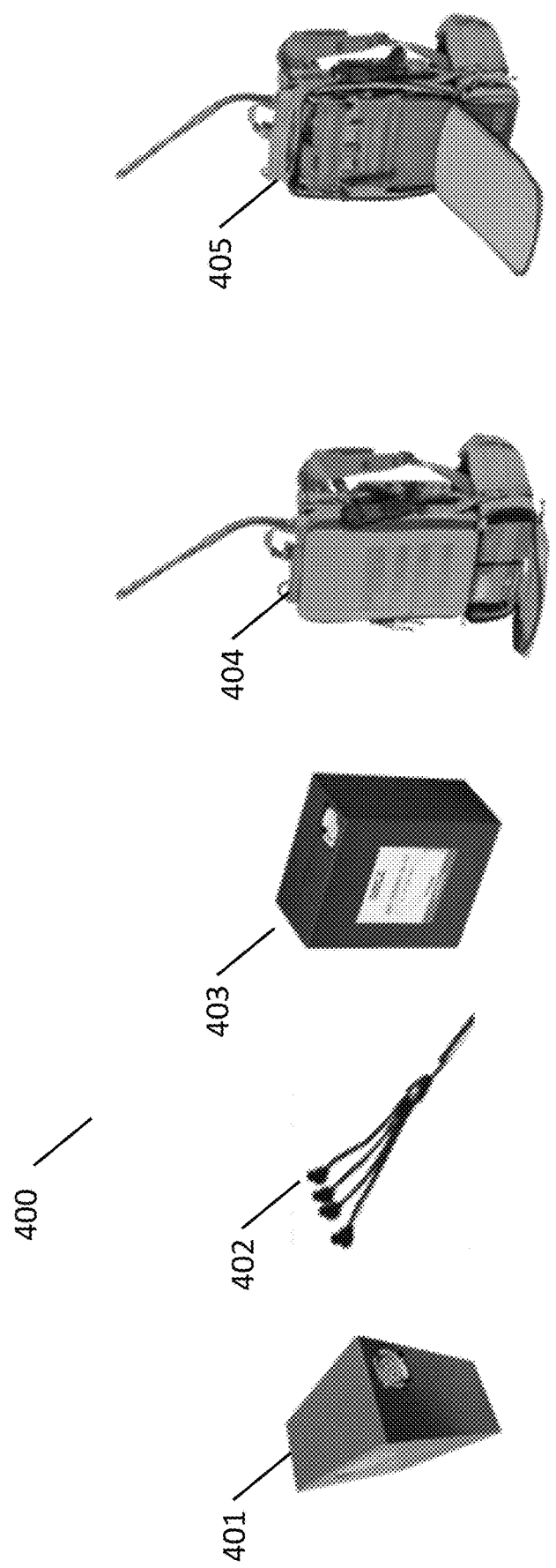
FIG. 4 is a diagram showing the batteries and power cables separate and installed in a Manpack base station, in accordance with some embodiments.

Smallest Form factor (27 LBS)
Less power consumption/longest power life
Instant deployment
Additional NIBs can mesh into NIB to extend coverage further
Self-optimization
The pack is built to hold
15 hours radio uptime
Up to 30 pounds
No tools required
Bottom weighted, stands up
Full HNG, EPC able to be part of the backpack, not in prior art
Over-the-top VoLTE
5G when available
5W when not carried but variable TX power available
Vibration resistant
Push-on connectors
Software update via Wi-Fi as well as ethernet FIG. 4 shows various power components 400. These include one or more batteries 401 and 403 and associated power cables 402. The batteries and power cable are insertable in to the base of the Manpack 404, while still permitting access to other components 405.

Regarding one or more embodiments, an exemplary embodiment may use a BA 5590 Battery or equivalent. The characteristics of such a battery could include: Voltage—15 Volts (12v Mode); Capacity—15000 mAh (12 Volt Mode) each; Weight—35.3 oz each; Chemistry—Lithium Sulphur Dioxide; Dimensions—5.00"×2.45"×4.41"; Qty 4 provides 8-12 hours of uptime (in some embodiments more or fewer batteries could be enabled).

In some embodiments a splitter may be provided. For example, an exemplary 12v 4-Way Splitter Sub Assembly: Allows Hot Swapping Batteries; Includes diodes to keep batteries and cells isolated; Provides 12v output on pins 4,5 (positive) & 1,2 (ground); has 20" Length/Not terminated/Ruggedized over Y splitter.

Military Communications Backpack Features
The Modular Pack System: includes a Rigid Dynamic Frame that absorbs shock and flexes with your body; includes a Bolstered Ventilation and Stability System; Allows stable and secure fit over body armor; includes PALS webbing to accommodate MOLLE accessories; includes a clear port over keyboard and display; Fits PRC117F/G or similar sized radio; and is built using custom spec'd: CORDURA® with Teflon®; PU coatings, UV, and weather protection; and YKK® zippers.

Figure 5:
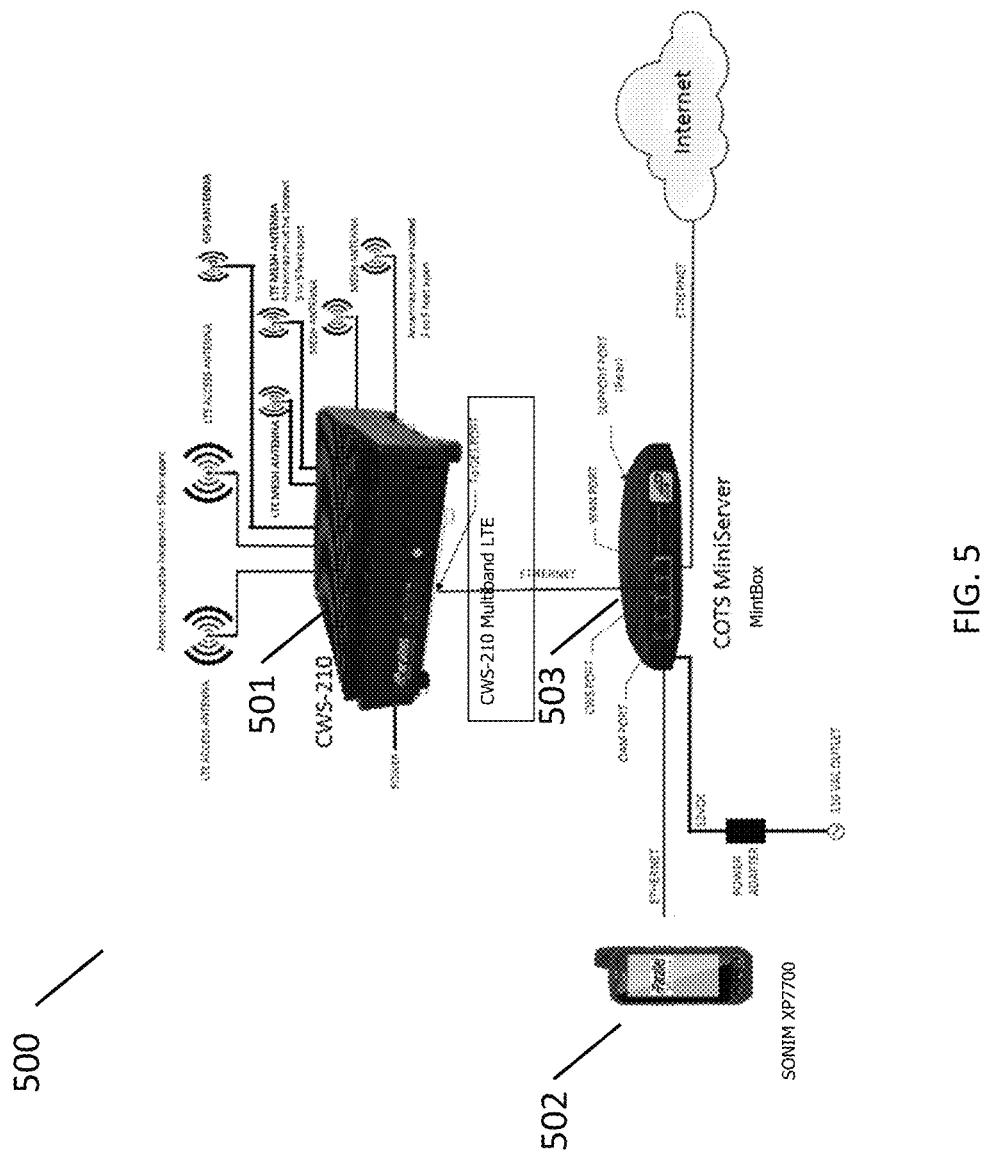
FIG. 5 is a block diagram showing different components and communication options of a Manpack base station, in accordance with some embodiments.

FIG. 5 shows a system 500 including short term output CWS-210 multiband LTE 501 and COTS server (mint box) 503, along with ruggedized handsets 502.

CWS-210 Multiband LTE (2×0.5 w) Features
Instant LTE connectivity
Dynamic LTE Frequency Scanning and Selection using:
Uni Manage w/browser via secure Wi-Fi or direct connection
Dynamic Geolocation using UniManage
Low power consumptions allows extended deployment with hot swappable batteries (4 batters provides 8 to 12 hours of use)
Design that lends itself to high volume manufacturing.
Robust—ruggedized enclosure, vibration/shock protection, dust/water protection.
Non-technical personnel deployment focused.
User friendly—single sided page quick start guide, color coded cables and connectors
Integrated mint box 503 requires no need to ruggedize or purchase ruggedized mini COTS server. More efficient power and availability. Less components provide PW with more control to access of components.

Figure 6:
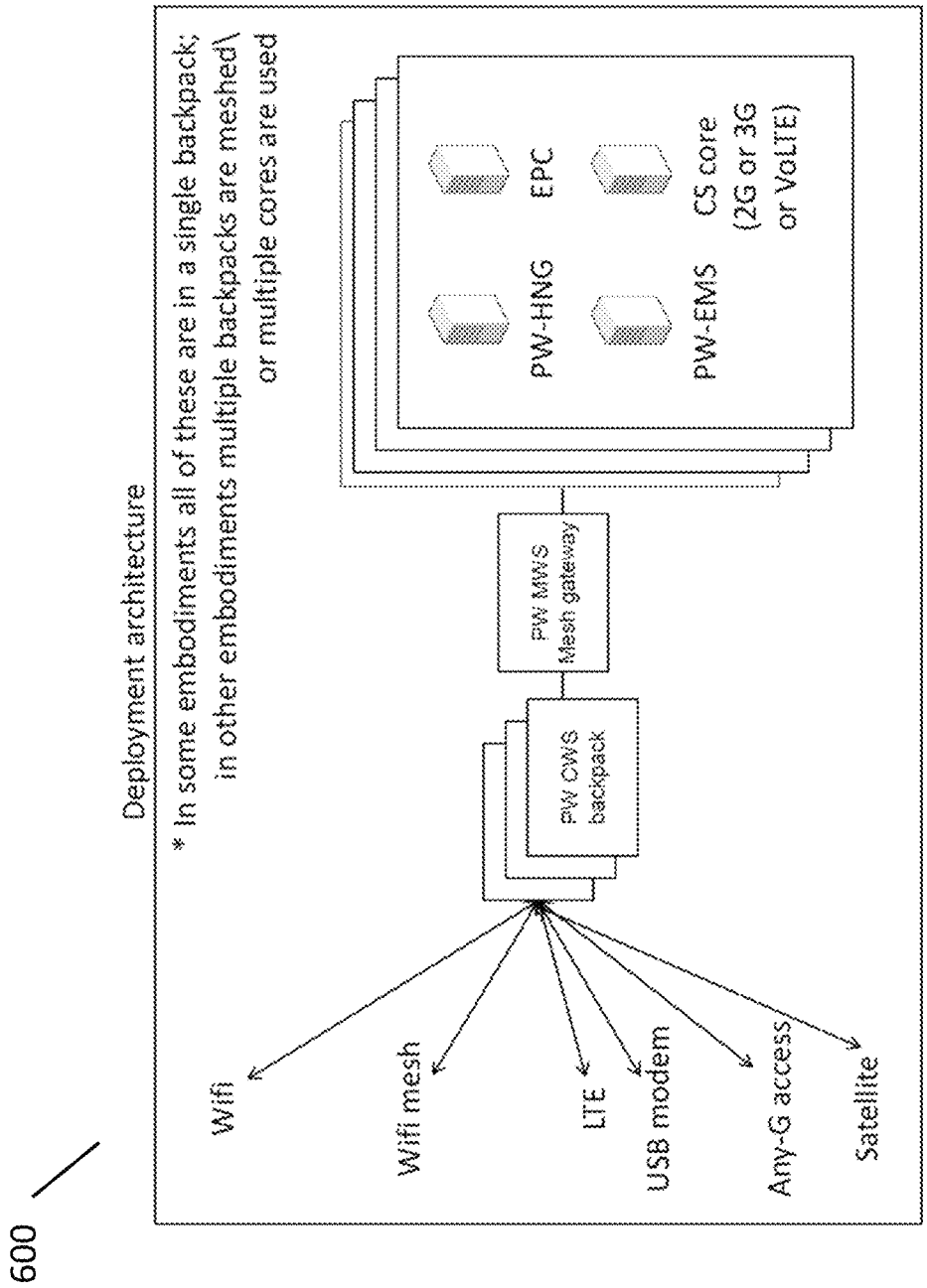
FIG. 6 is a block diagram showing a deployment architecture for a Manpack base station, in accordance with some embodiments.

Antenna Systems
Accepts LTE access antenna based on use case requirements
Accepts Wi-Fi/Mesh antenna based on use case requirements
Accepts LTE backhaul antenna based on use case requirements
Mint Box Software & Features
HetNet Gateway
EPC
UniManage via Web browser on LTE Device or Laptop
Content Server Running Asterix
Allows OTT voice application w/out licensing costs
Secure WiFi to allow scanning and selection of available frequencies
Size allows for N+1 redundancy
Non-Technical Personnel Features
Color coded cables and connectors
QuickStart guide FIG. 6 is a diagram 600 showing deployment architecture. In some embodiments all of these are in a single backpack; in other embodiments multiple backpacks are meshed or multiple core are used.

The foregoing discussion discloses and describes merely exemplary embodiments of the present invention. As will be understood by those skilled in the art, the present invention may be embodied in other specific forms without departing from the spirit or essential characteristics thereof. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 5G, other 3G/2G, legacy TDD, or other air interfaces used for mobile telephony. The above ideas may be applied to any and all of 5G NR, standalone and non-standalone, 4G only, 3G/4G, 2G/3G/4G, or any other multi-RAT deployment architecture. Although the above systems and methods are described in reference to base stations for the Long Term Evolution (LTE) standard and the 3GPP 5G standard, one of skill in the art would understand that these systems and methods could be adapted for use with other, present, past, or future wireless standards or versions thereof. Where eNB is mentioned, a 2G base station, 3G nB, 5G gNB, or any other base station could be used. The CWS or base station can be a multi-RAT base station; the CWS is in some embodiments capable of Wi-Fi meshing.

Although the above systems and methods describe specific hardware configurations, the hardware could involve any combination or permutation of well-known data center hardware running specialized software or generic software as described herein. Containerization, OS-level or other virtualization methods could be used and various networking techniques and topologies could be used for the hardware and software running on the hardware.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A communications backpack comprising:
a backpack;
a Radio Area Network (RAN) device in mechanical communication with the backpack;
a mini-server in mechanical communication with the backpack and in electrical communication with the RAN device;
at least one hot swappable battery in mechanical communication with the backpack and in electrical communication with the RAN device and the mini-server;
at least one antenna, wherein the at least one antenna is stored in a first position alongside the backpack wherein the at least one antenna is not in electrical communication with the RAN device and therefore not drawing power or providing signals to the RAN device, and is movable to a second position where the antenna is coupled to the backpack and in electrical communication with the RAN device; and
wherein the communications backpack provides a coverage area of up to 3 kilometers (km).

2. The communications backpack of claim 1 further comprising at least one handset in communication with the RAN.

3. The communications backpack of claim 1 further comprising multiple Radio Frequency (RF) outputs.

4. The communications backpack of claim 1 wherein the RAN comprises any G technology.

5. The communications backpack of claim 1 further comprising multiple backhaul.

6. The communications backpack of claim 5 wherein the backhaul uses one or more of LTE, Ethernet, satellite and mesh.

7. The communications backpack of claim 1 wherein at least one hot swappable battery is rechargeable.

8. The communications backpack of claim 1 wherein the at least one antenna comprises a single multifunction antenna.

9. The communications backpack of claim 8 wherein the at least one antenna comprises a panel antenna.

10. The communications backpack of claim 1 wherein the at least one antenna comprises a single pole antenna.

11. The communications backpack of claim 1 further comprising a radio transparent panel disposed above the at least one antenna.

* * * * *